(12) United States Patent
Rabaut et al.

(10) Patent No.: US 11,965,478 B2
(45) Date of Patent: *Apr. 23, 2024

(54) DEVICE AND METHOD FOR LIFTING AN OBJECT FROM A DECK OF A VESSEL SUBJECT TO MOVEMENTS

(71) Applicant: DEME Offshore BE N.V., Zwijndrecht (BE)

(72) Inventors: Dieter Wim Jan Rabaut, Ghent (BE); Jeroen Van Loon, Vosselaar (BE)

(73) Assignee: DEME Offshore BE N.V., Zwijndrecht (BE)

( * ) Notice: Subject to any disclaimer, the term of this patent is extended or adjusted under 35 U.S.C. 154(b) by 242 days.

This patent is subject to a terminal disclaimer.

(21) Appl. No.: 17/259,269

(22) PCT Filed: Jul. 5, 2019

(86) PCT No.: PCT/EP2019/068171
§ 371 (c)(1),
(2) Date: Jan. 11, 2021

(87) PCT Pub. No.: WO2020/011681
PCT Pub. Date: Jan. 16, 2020

(65) Prior Publication Data
US 2021/0276668 A1    Sep. 9, 2021

Related U.S. Application Data

(63) Continuation of application No. 16/031,329, filed on Jul. 10, 2018, now Pat. No. 10,308,327.

(51) Int. Cl.
*B66F 7/20* (2006.01)
*B63B 25/28* (2006.01)
(Continued)

(52) U.S. Cl.
CPC ............. *F03D 13/10* (2016.05); *B63B 25/28* (2013.01); *B63B 27/30* (2013.01); *B65G 67/62* (2013.01);
(Continued)

(58) Field of Classification Search
CPC . B63B 27/10; B63B 2017/0072; B63B 25/28; B63B 27/30; B66C 23/52;
(Continued)

(56) References Cited

U.S. PATENT DOCUMENTS 2,865,518 A   12/1958   Matheisel
4,174,188 A   11/1979   Brun
(Continued)

FOREIGN PATENT DOCUMENTS

EP    2572976 A1   3/2013
GB    2440520 A    2/2008
(Continued)

OTHER PUBLICATIONS

International Search Report and Written Opinion for corresponding International Application No. PCT/EP2019/068171 dated Oct. 29, 2019.
(Continued)

*Primary Examiner* — Gregory W Adams
(74) *Attorney, Agent, or Firm* — Renner, Otto, Boisselle & Sklar, LLP (57) ABSTRACT

Described is a device for lifting an object from a deck of a vessel subject to movements in a heave direction. The device comprises a support surface (6a) for the object provided at a first height (11) in the heave direction relative to the deck. A lifting crane (5) is configured to take up the object from the support surface (6a) at a lifting point thereof at a lifting speed. An actuator system (16) is configured to lower the support surface (6a) relative to the deck at the instant in time
(Continued)

at which the object is lifted from the surface to a second height in the heave direction at a lowering speed. A method using the device is also described.

13 Claims, 8 Drawing Sheets (51) Int. Cl.
| | | |
|---|---|---|
| *B63B 27/14* | (2006.01) | |
| *B63B 27/30* | (2006.01) | |
| *B63B 39/02* | (2006.01) | |
| *B65G 67/62* | (2006.01) | |
| *B66C 13/02* | (2006.01) | |
| *F03D 13/10* | (2016.01) | |
| *B63B 27/10* | (2006.01) | |
| *B66C 1/00* | (2006.01) | |

(52) U.S. Cl.
CPC ............... *B66F 7/20* (2013.01); *B63B 27/10* (2013.01); *B66C 1/00* (2013.01); *F05B 2230/6102* (2013.01); *F05B 2240/95* (2013.01)

(58) Field of Classification Search
CPC ....... B66C 23/53; B66C 13/02; B66C 13/063; B66C 13/46; B66C 13/48; F03D 13/10; F05B 2230/6102; F05B 2240/95
See application file for complete search history.

(56) References Cited

U.S. PATENT DOCUMENTS

| | | |
|---|---|---|
| 4,475,630 A | 10/1984 | Jackson |
| 5,577,874 A | 11/1996 | Olsen |
| 5,947,740 A | 9/1999 | Kim |
| 6,135,695 A | 10/2000 | Kindem et al. |
| 7,152,547 B1 | 12/2006 | Hovland |
| 8,051,791 B2 | 11/2011 | Hovland |
| 8,403,673 B2 | 3/2013 | Atluri et al. |
| 8,752,618 B2 | 6/2014 | Pose |
| 9,340,263 B2 | 5/2016 | Koppert |
| 9,487,277 B2 | 11/2016 | van der Tempel et al. |
| 2003/0123957 A1 | 7/2003 | Jordan |
| 2013/0099054 A1 | 4/2013 | Besenzoni |
| 2014/0217343 A1 | 8/2014 | Sefrin |
| 2017/0096196 A1 | 4/2017 | Foo et al. |

FOREIGN PATENT DOCUMENTS

| | | |
|---|---|---|
| GB | 2538986 A | 12/2016 |
| WO | 2008020459 A2 | 2/2008 |
| WO | 2014158025 A1 | 10/2014 |

OTHER PUBLICATIONS

International Preliminary Report on Patentability for corresponding International Application No. PCT/EP2019/068171 dated Jul. 3, 2020.

Fig. 7

DEVICE AND METHOD FOR LIFTING AN OBJECT FROM A DECK OF A VESSEL SUBJECT TO MOVEMENTS This application is a national phase of International Application No. PCT/EP2019/068171 filed Jul. 5, 2019 and published in the English language, which is a continuation of U.S. application Ser. No. 16/031,329 filed Jul. 10, 2018, now U.S. Pat. No. 10,308,327 issued Jun. 4, 2019, both of which are hereby incorporated herein by reference.

TECHNICAL FIELD OF THE INVENTION

The invention relates to a device and method for lifting an object from a deck of a vessel subject to movements in a surge, sway and heave direction. The invention relates particularly to a device and method for lifting a component of a wind turbine from a deck of a vessel subject to movements.

BACKGROUND OF THE INVENTION

The invention will be elucidated with reference to components of an offshore wind turbine. The reference to such a wind turbine does not however imply that the invention is limited thereto, and the device and method could be applied for lifting any other object, such as for instance used for offshore foundation structures, jetties, radar and other towers, and the like.

A vessel in a water mass is subject to movements according to six degrees of freedom. Translational movements comprise heave, sway and surge. Where heave is a vertical movement, sway is the side to side or port to starboard movement and surge is the front to back or bow to stern movement. Rotational movements comprise pitch, roll and yaw. Where pitch is a rotation of a vessel about its lateral (port-starboard) axis, roll is the rotation about its longitudinal (bow-stern) axis, and yaw is the rotation about its vertical axis. Heave, sway, surge, pitch, roll and yaw movements are defined in a coordinate system fixed to the floating vessel and therefore may differ from movements in the vertical and two horizontal directions, defined by a coordinate system fixed to the outside world.

The motions of the water mass are transferred to a vessel that is floating in the water mass. The induced vessel movements, in turn, impose movements and accelerations on objects that are transported by the vessel or manipulated on the vessel. When lifting an object from a deck of a floating vessel with a crane for instance, the relative movement between the floating vessel and the object during the lifting operations may cause the object to re-hit with parts of the vessel, or with another structure on the vessel. This is especially the case when the lifting crane is not provided on the floating vessel itself, but is provided on another floating vessel and/or on a stabilized vessel or platform, such as a jack-up platform that is separate from the object's vessel. Re-hitting the component with the floating vessel could damage the lifted object, parts of the vessel, both, or other items in the vicinity of the lifted object. For instance, after a re-hit, the object may be subject to uncontrolled swinging movements.

According to the state of the art, the risk for a re-hit of the lifted object with the vessel during lifting may be avoided by providing a system that is configured to actively compensate movements of the object relative to the deck of the vessel. Such a system may for instance compensate two rotational movements (pitch and roll) and one translational (heave) movement of the vessel in order for a platform carrying the object to stay substantially horizontal at a fixed height relative to an outside world reference system while the vessel is moving in pitch, roll, and heave directions underneath. The known active compensation system is operable in conjunction with a fixed crane, typically provided on the deck of a jack-up platform, separate from the floating vessel carrying the objects to be lifted. The active compensation will hold the platform and the object on top of the platform substantially stationary relative to the fixed crane. The legs of the jack-up vessel provide the required stability.

Although the known system may be used in some circumstances, it lacks flexibility. It cannot be used for larger objects. Also, the active compensation has to be operable before, during and after lifting, and the risk for material and personal damage is substantial should the compensation for some reason fail temporarily.

SUMMARY OF THE INVENTION

It is an aim of the invention to provide a device and method that may limit the above mentioned risk for a re-hit in an efficient and fail-safe manner. Another aim is to provide a device and method that makes it possible to safely lift objects offshore from a deck of a vessel, in particular a floating vessel.

Provided for this purpose according to the invention is a device in accordance with claim 1. The device is suitable for lifting an object from a deck of a vessel, subject to movements, in a heave direction, and comprises:
- a support surface for the object provided at a first height in the heave direction relative to the deck;
- a lifting crane configured to take up the object from the support surface at a lifting point thereof at a lifting speed; and
- an actuator system configured to lower the support surface relative to the deck at an instant in time at which the object is lifted from the surface to a second height in the heave direction at a lowering speed.

The invention enables increasing the workable sea states for lifting objects from a deck of a floating vessel without having a re-hit, and without having to use complex continuously active compensation systems. Workable sea states for lifting without re-hit without any compensation system may be defined by the specifics (geometry and weight) of the object to be lifted, by the engineered Dynamic Amplification Factor (DAF) to be taken into account to ensure safe lifting operations, by the lifting speed of the crane and by the specifics of the floating vessel, including the loading configuration of the vessel.

The invention may be envisaged as an artificial increase of the lifting speed of the used lifting crane. The relative speed and acceleration that occurs between the lifted object and its sea fastening on the support surface indeed is increased upon lifting by introducing a support surface for the object to be lifted on the vessel that is able to retract in a heave direction towards the deck of the floating vessel as soon as the object is lifted from the surface. Retraction in the heave direction towards the vessel's deck occurs in a sense that is opposite to the sense of the lifting direction, which is away from the deck of the vessel. Said instant in time may for instance be detected when a substantial part of the weight of the object, up to the complete weight of the object, is transferred from the support surface to the lifting crane. The lowering or retraction speed of the support surface is in this manner actually added to the lifting speed of the crane. This considerably reduces the risk of a re-hit, in particular in case of an upward movement of the deck of the vessel in the vertical direction as caused by heave, pitch or roll of the vessel.

An embodiment of the invention provides a device comprising a sensor configured to determine the optimal instant in time to start lifting operations.

An embodiment of the invention provides a device comprising a detector configured to determine the instant in time, i.e. the moment the object is lifted off the support surface.

As already mentioned above, a vessel when floating on water is subjected to movements exhibiting 6 degrees of freedom, including three translational movements and three rotational movements. In a Cartesian coordinate system linked to a vessel, and defining the z-axis as extending vertically, the x-axis as extending in a longitudinal direction of the vessel and the y-axis as extending in a transverse direction of the vessel, an x-axis translational movement is referred to in the art as surge, a y-axis translational movement as sway, and a z-axis translational movement as heave. A rotational movement of the vessel around the x-axis is referred to as roll, a rotation around the y-axis as pitch, and a rotation of the vessel around the z-axis as yaw. Notably, the (x,y)-plane formed by the deck of the vessel will not be parallel to a plane extending parallel to the underwater bottom motion, due precisely to the vessel's motion on the water. The invented device particularly operates in the heave or z-direction of the vessel.

A suitable lowering or retraction speed of the platform and retraction distance or height may be determined on a case by case basis to achieve a scenario specific maximum sea state to work in and to achieve accompanied workability's for the lifting operations.

The invention may be used for lifting any object. Examples of such objects comprise but are not limited to turbine components, such as tower (parts), full towers, split tower sections (for instance two or three sections), nacelles (optionally provided with a rotor), blades (or a blade rack provided with a single blade or containing multiple blades), and a pre-assembled combination of the above in any form; wind turbine foundation components such as monopiles, transition pieces, anode cages (or an anode cage tower containing multiple anode cages), and all types of jacket foundations; and general items, such as but not limited to supply containers of any kind, offshore wind turbine (foundation) installation equipment, and spare vessel and equipment parts. The weight of the objects is immaterial to the invention but objects weighing 350 tons (a split tower section for instance) and up to 1600 tons (a monopile or jacket foundation) and more, may be lifted with the support of the invented device.

The lifting point or points may be located everywhere on the object to be lifted, or may comprise a lifting surface, such as when a suspension frame or sling is used for lifting. The lifting point preferably comprises an upper part or end of the object.

According to an embodiment of the invention, the support surface is connected to the deck such as to substantially prevent its movement relative to the deck in the sway and surge directions. In this embodiment, the support surface is connected to the deck such that it substantially moves together with movements of the deck of the vessel in the sway and surge directions.

The first height of the support surface relative to the height of a deck of the vessel may be chosen according to the circumstances. The support surface positioned at the first height may be level with the deck for instance, or below the deck or above the deck. A useful embodiment relates to a device wherein the first height of the support surface is above deck.

The second height of the support surface relative to the height of a deck of the vessel may also be chosen according to the circumstances, as long as it is lower than the first height. The support surface positioned at the second height may be level with the deck for instance, or below the deck or above the deck. A useful embodiment provides a device wherein the second height of the support surface is above deck.

The retraction height capability of the device, i.e. the difference between the first and the second height the device is capable of bridging, may be determined according to known engineering practices for each specific lifting operation. The invented device provides the flexibility to be custom built according to a client's needs taking into account the specific vessel from which it has to operate, the specific maximum dimensions and weight of the object to be lifted, operational crane limitations, and the sea states in which one would like to safely operate. By performing a motion analysis for all the specific lifts, a worst case scenario can be identified and the maximum retraction height and support surface size of the device may be defined. Such a scenario further makes the device suitable and fail proof for lifting less critical objects.

Useful embodiments of the invention provide a device wherein the difference between the first and the second height (the retraction height capability) is larger than 0.5 m, more preferably larger than 0.75 m, even more preferably larger than 1 m, even more preferably larger than 1.25 and most preferably larger than 1.5 m. In other useful embodiments, the retraction height capability is smaller than 3 m, even more preferably smaller than 2.5 m, even more preferably smaller than 2.0 m, and most preferably smaller than 1.75 m.

The lowering speed of the support surface may also be chosen within a large range, depending on the circumstances at hand, for instance dependent on the maximum lifting speed offered by the lifting crane. An embodiment of the invention provides a device wherein the lifting crane has a maximum lifting speed, and the actuator system of the device is configured to lower the surface at a lowering speed larger than 10% of the maximum lifting speed, more preferably larger than 25% of the maximum lifting speed, and even more preferably larger than 50% of the maximum lifting speed.

The retraction or lowering of the support surface from the first height to the second height is preferred to occur relatively fast in order to avoid any collision or re-hit of the lifted object with parts of the vessel, which may also be the support surface itself. A useful embodiment thereto provides a device wherein the actuator system is configured to lower the support surface at a lowering acceleration of larger than 10% of the gravitational acceleration, more preferably larger than 25% of the gravitational acceleration, even more preferably larger than 50% of the gravitational acceleration, and most preferably substantially equal to, or even larger than, the gravitational acceleration.

In a practical embodiment of the device according to the invention, the actuator system comprises distance-varying means provided between the support surface and a base surface, and configured to vary the distance in the heave direction between the support surface and the base surface. The base surface provides a substantially rigid support for the distance-varying means and allows those means to 'push' the support surface and an object positioned thereon away from the base surface. The base surface absorbs the object's weight, transmitted by the support surface and the distance varying means, to a deck of the vessel.

A convenient embodiment provides distance-varying means comprising cylinder-piston units.

In order to provide a relatively stiff connection between the first and second surfaces in the heave direction, but also in other directions, an embodiment provides a device wherein the distance-varying means each have a longitudinal axis and the longitudinal axis of some distance-varying means extends in the heave direction, whereas the longitudinal axis of other distance-varying means extends at a non-zero acute angle with the heave direction. The non-zero acute angle preferably ranges between 20-70°, more preferably between 30-60°, and most preferably between 40-50°.

In a useful embodiment of the invention, the support surface is provided by at least one support platform that is connected to the deck of the floating vessel. A support platform may be strong enough to carry (part of) an object to be carried on deck of the floating vessel. The number of support platforms can be chosen within a wide range, depending on the dimensions of the object to be lifted and other practical considerations. When using a support platform, an upper surface of such platform provides the support surface. The support platform may be movable in a heave direction from a position where the support surface is at the first height to a position in which the support surface is at a second height which is lower than the first height. The support platform may also be movable in a heave direction from a position where the support surface is at the second height to a position in which the support surface is at a first height which is higher than the second height.

A convenient embodiment provides a base platform, comprising two plates between which are arranged the distance varying means. A top plate is movable by the distance varying means with respect to a base plate. When a base platform is slid underneath a support platform, the support platform may be lowered or lifted in the heave direction relative to the deck of the floating vessel by lowering or lifting the top plate of the base platform relative to the base plate of the base platform. In this way, the support surface may be lowered or lifted conveniently.

The base platform is preferably movable across the deck of the floating vessel, for instance by providing rails on the deck and providing the base platform with wheels. The actuator system of the invention in this embodiment at least comprises the base platform and the distance varying-means acting to lower or lift the top plate of the base platform.

Another useful embodiment relates to a device wherein components of the actuator system are interlinked by a hydraulic system comprising a pump or high pressure unit and/or accumulator. The hydraulic system may comprise cylinder-piston-units as distance-varying means. Such cylinder-piston units typically comprise a piston side and a pressure side, the latter being hydraulically connected to a pump or accumulator for pressurizing the cylinder-piston units. Pressurizing the cylinder-piston units causes the piston to extend from the cylinder, whereas depressurizing causes the piston to retract.

A useful embodiment offering flexibility provides a device wherein the base surface is provided by a part of the deck. This embodiment provides a fixed base surface. Another embodiment of the invention proposes a device wherein the base surface is provided by a base structure configured to be moved across the deck of the vessel in at least one of the surge and sway directions, or a direction at an acute non-zero angle with one of these directions.

Yet another embodiment relates to a device wherein the deck supports a plurality of support surfaces and the base structure is configured to be moved across the deck of the vessel to a position underneath each support surface. This embodiment allows storing and securing a plurality of objects on the vessel, in particular on the plurality of support surfaces, and use one or a limited quantity of base structures. In case of multiple base structures, these may be controlled separately or in combination. A plurality of base structures that are controlled in combination may be used for storing a large object on the plurality of support surfaces, such that such an object may be compensated in the heave direction on multiple support surfaces by multiple base structures working together.

In another embodiment of the invention, a device is provided wherein the base structure is provided with wheels and may be moved across the deck on rails provided on the deck.

In order to be able to accommodate relatively large weights of some objects, a device according to an embodiment comprises wheels provided in an undercarriage such as a bogie. Such an embodiment of the traction system of the base surface efficiently spreads the loads caused by the weight of the object.

According to an embodiment of the invention, the device comprises a detector configured to determine the instant in time at which the object is lifted from the surface. Any device, person or method known in the art may be used for this purpose. It is for instance possible to detect the instant in time at which the object is lifted from the surface by a human operator, for instance the operator of the lifting crane. It is also possible that the detector comprises optical means, such as a camera directed to the support surface. A useful embodiment of the invention provides a device wherein the detector comprises a force sensor provided in the support surface. A force sensor, or a plurality of force sensors, provided in the support surface will detect a force when an object is supported by the support surface. Such force will decrease to a negligible or nil value when an object has left the support surface. Measuring the force therefore yields information about the instant in time at which the object is lifted from the surface. Another embodiment may use a load measuring system provided in the lifting crane. When the total or a predefined part of the object's weight is actually registered by the crane load measuring system, this will correspond to the instant in time.

The output of the detector causes a control signal to the actuator system of the invented device to retract the support surface. The control signal may be transmitted by any means in the art, such as by a wireless system for instance.

Yet another embodiment relates to a device wherein a monitoring means is configured to determine the optimal instant in time at which the object is to be lifted by monitoring the periodic movements of the vessel in the vertical direction at the location of the object. Such monitoring means are known per se and may comprise an accelerometer and/or gyroscope and/or motion reference unit and/or other sensors. Preferably, the monitoring means are configured to determine a maximum height of the vessel at the location of the object in the vertical direction. It may then be desirable to initiate the lifting operation at an instant in time at which the floating vessel at the location of the object experiences a maximum height in the vertical direction in its periodic movement. The aim of the optional monitoring means is to foresee the instant in time at which the lifting operation is preferably initiated, or, in other words, to determine the intended instant in time for lifting. The aim of the optional detector is to actually determine this instant in time.

The device of the invention may be operated by an operator of the vessel, the crane or any other component of the device. For instance, an operator of the crane may operate the crane at an instant in time to lift an object from a support surface, and about simultaneously operate the actuator system to lower the support surface relative to the deck at the instant in time to a second height in the heave direction at a lowering speed. In this embodiment, the operator functions as the claimed detector. He may also view the output values of the detector and, when these values are subject to a sudden change, operate the actuator system in response to the detector output.

In a useful embodiment of the invention, the device further comprises a control system configured to generate control signals for the actuator system in response to the detector output. In particular, such control system may be configured to generate control signals for the actuator system that cause the support surface to lower relative to the deck at an instant in time to a second height in the heave direction at a lowering speed, in response to a detector output that is subject to a sudden change at the instant in time.

Accurate positioning of the object to be lifted may be enhanced by an embodiment of the invented device in which the vessel comprises a dynamic positioning (DP) or mooring system. Such systems, known per se, allow keeping a vessel in a relatively constant position relative to an underwater bottom and/or in a relatively constant position relative to the crane, at least within some tolerances, without using spud poles, as in a jack-up platform for instance. The mooring system may comprise a number of mooring lines, provided at one end with a suitable means for connecting to the underwater bottom or means for connecting to another structure, and at another end provided around a winch or other suitable taking in/paying out means. The number of mooring lines may be chosen conveniently between one and any number, for instance 2, 3, 4, 5, 6, 7, 8, 9, 10, or even more. The aim of the positioning system is to keep the actual position of the floating vessel relative to the underwater bottom or to the crane used for lifting within a safe distance from the position of the crane, allowing for safe lifting operations.

The device is particularly useful for lifting a foundation element of a wind turbine and providing the foundation element into an underwater bottom from a deck of a vessel, preferably a floating vessel, according to methods as elucidated in the appended claims.

A particularly useful purpose of the invention is to assist in lifting an object from a floating vessel that itself may lack a crane suitable for lifting the object, by employing a lifting crane provided on another floating or jacked-up vessel, or on any other possible support base different from the floating vessel. After having lifted the object off the floating vessel, the object may be placed directly onto or into an underwater bottom. It may however also be placed on deck of the floating vessel itself, or it may be placed onto the deck of yet another supporting platform within crane reach, which may be the deck of another floating or jack-up vessel. Another possibility is to place the object on top of a pre-installed wind turbine generator (WTG) part, or on a quay wall, jetty, oil rig platform, and the like.

Another aspect of the invention indeed relates to a method for lifting an object from a deck of a vessel subject to movements in a heave direction, the method comprising:
positioning the object to be lifted on a support surface for the object provided at a first height in the heave direction relative to the deck;
taking up the object with a lifting crane from the support surface at a lifting point thereof at a lifting speed; and
activating the actuator system to lower the support surface relative to the deck at an instant in time at which the object is lifted from the surface to a second height in the heave direction at a lowering speed.

An embodiment of the invented method further comprises lowering the object onto and into the underwater bottom, and decoupling the object from the lifting crane. As mentioned above, the method may also comprise lowering the object onto any other support base, such as on deck of the vessel that accommodates the lifting crane, or on deck of another platform that is not necessarily under water but can also be above water, such as a pre-installed foundation, another jack-up vessel or a quay wall for instance.

Another useful embodiment of the method further comprises determining the instant in time at which the object is to be lifted by monitoring the periodic movements of the vessel in the heave direction. The instant in time at which the object is to be lifted preferably corresponds to a maximum height of the vessel in the vertical direction at the object's location.

Another useful embodiment of the method comprises determining the instant in time at which the object is lifted from the surface by a detector.

Yet other useful embodiments of the method are those wherein the support surface is connected to the deck and its movement relative to the deck is substantially prevented in the sway and surge directions; wherein the first height of the support surface is above deck; wherein the second height of the support surface is above deck; wherein the difference between the first and the second height is larger than 0.5 m, more preferably larger than 1 m, more preferably smaller than 2 m, and even more preferably smaller than 1.5 m; wherein the lifting crane has a maximum lifting speed, and the actuator system lowers the surface at a lowering speed larger than 10% of the maximum lifting speed, more preferably larger than 25% of the maximum lifting speed, and even more preferably larger than 50% of the maximum lifting speed; wherein the actuator system lowers the surface at a lowering acceleration substantially equal to the gravitational acceleration; wherein the distance in the heave direction between the support surface and the base surface is varied by the actuator system comprising distance-varying means provided between the support surface and a base surface; wherein the distance in the heave direction between the support surface and the base surface is varied by cylinder-piston units; wherein the base surface is moved across the deck of the vessel in at least one of the surge and sway directions; wherein the base structure is moved across the deck of the vessel to a position underneath each of a plurality of support surfaces; wherein the base structure is moved across the deck on rails provided on the deck; wherein the sensor measures movements imposed on the vessel at the location of the support platform and determines the optimal instant in time to start lifting operations; wherein the instance in time detector at which the object is lifted from the surface is determined by a force sensor provided in the support surface, or by any other suitable sensor; wherein a control system generates control signals for the actuator system in response to the detector output, preferably the force sensor; and/or wherein the vessel is a floating vessel and its position is regulated by a dynamic positioning (DP) or mooring system.

It is expressly stated that the embodiments of the invention described in the present patent application can be combined in any possible combination of these embodiments, and that each embodiment can individually form the subject-matter of a divisional patent application.

BRIEF DESCRIPTION OF THE FIGURES

The invention will now be elucidated with reference to the following figures, without however being limited thereto. In the figures.

DESCRIPTION OF EXEMPLARY EMBODIMENTS

Figure 1:
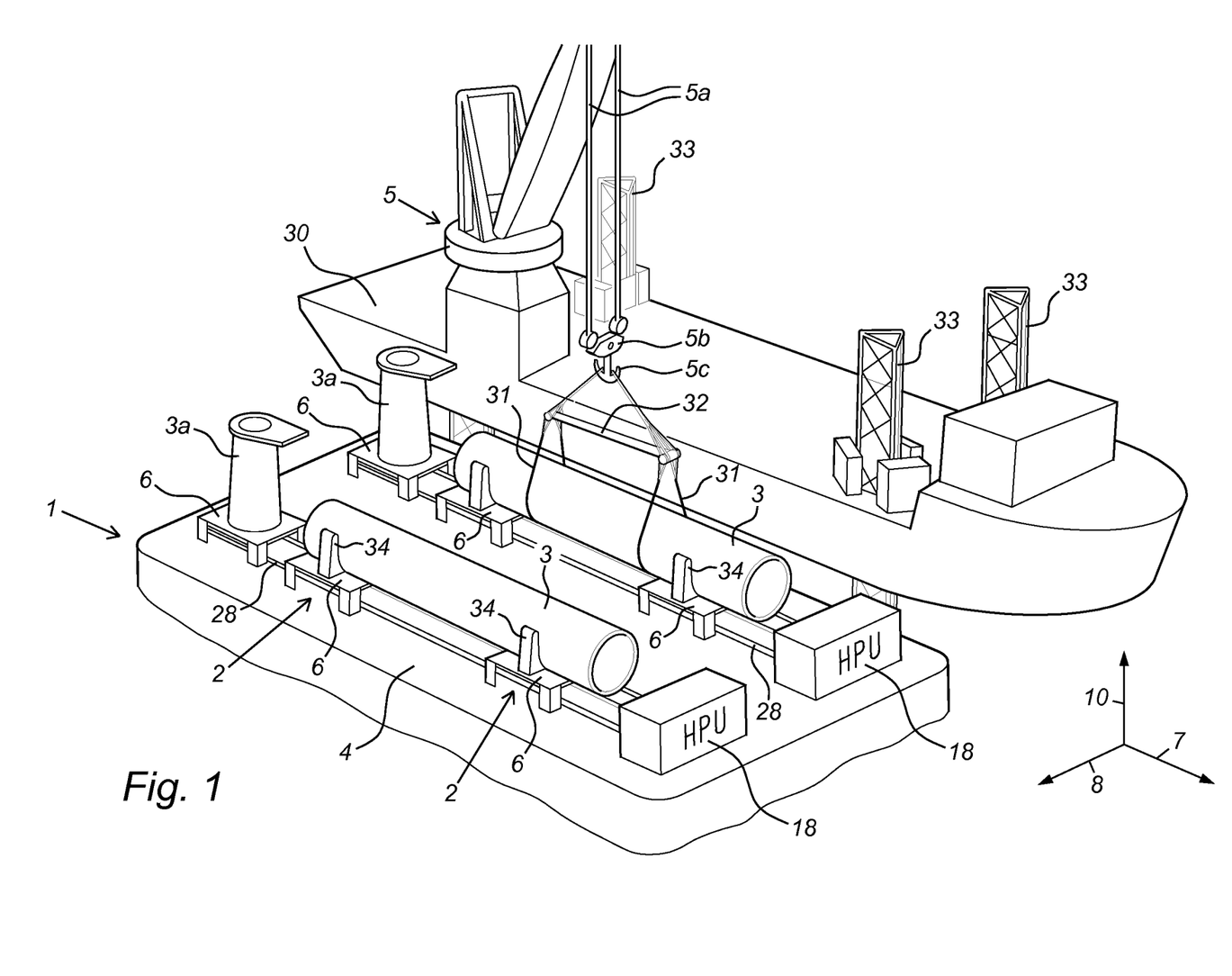
FIG. 1 represents a schematic perspective view of a floating vessel provided with objects and a device for lifting the objects according to an embodiment of the invention in which a lifting crane is operated from a jack-up platform.

Referring to FIG. 1, a vessel 1 is shown that is equipped with a plurality of devices 2 according to an embodiment of the invention. The vessel 1 is free-floating and may for instance represent a barge or platform supply vessel. The device 2 is used for assisting in lifting a monopile 3 from a deck 4 of the vessel 1. Other objects to be lifted may be present on the deck 4 of the vessel 1, such as transition pieces 3a.

A jack-up platform 30 is positioned next to the floating vessel 1 and supports a lifting crane 5, pivotably provided around a vertical axis on a base. The crane 5 is provided with hoisting cables 5a and, at a free outer end thereof, with a hoisting block 5b with a hook 5c, from which a monopile 3 may be suspended in use by providing the monopile 3 in slings 31, attached to the ends of a carrying frame 32. The jack-up platform 30 is stabilized with respect to the underwater bottom by spud poles 33 that rest on the underwater bottom, and the lift is preferably executed in the jacked-up position.

Figure 2:
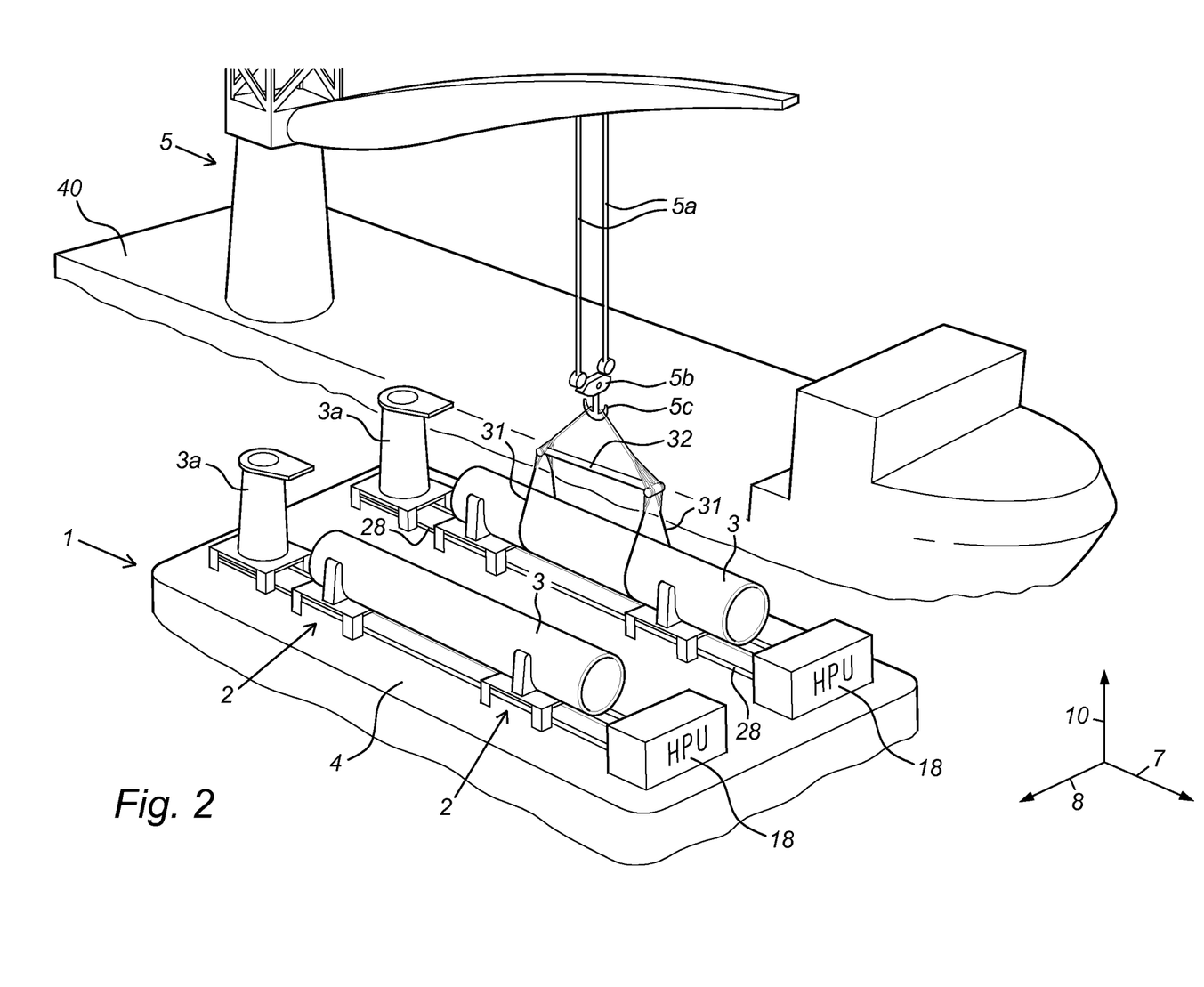
FIG. 2 represents a schematic perspective view of a floating vessel provided with objects and a device for lifting the objects according to the embodiment of FIG. 1 but in which a lifting crane is operated from another floating vessel.

FIG. 2 shows another embodiment in which the lifting crane 5 is supported by a second floating vessel 40, provided next to the floating vessel 1 on which the monopiles 3 to be lifted are stored. In the embodiment shown in FIG. 2, the vessel 40 may be equipped with a dynamic positioning and/or mooring system (not shown), known per se. The floating vessel 40 in this embodiment is able to keep control of its yaw, surge and sway motions, and limit these motions to pre-determined allowable distances. This embodiment is instrumental in further reducing the risk for damage to the lifting crane 5 during lifting of the monopile 3, since movements of the lifting crane 5 with respect to the monopiles 3 to be lifted are kept within allowable distances by the dynamic positioning and/or mooring system.

As shown in FIGS. 1 to 3B, the objects to be lifted, such as the monopiles 3 and the transition pieces 3a are supported on support platforms 6, provided onto the deck 4 of the vessel 1. The support platforms 6 shown are dimensioned to secure a transition piece 3a or a monopile 3 to the deck 4 during transport and before lifting. A plurality of support platforms 6 may be needed to support a monopile 3, for instance two at each end of the monopile 3, and connected to the deck 4 of the vessel 1. A number of platforms 6 may also be provided along a line to support different objects. For instance, in the embodiment shown in FIGS. 1 and 2, two support platforms 6 carrying a monopile 3 are aligned with one support platform 6, carrying a transition piece 3a. This arrangement is repeated in a sway direction 8. This may have several advantages as will be elucidated below.

Figure 4:
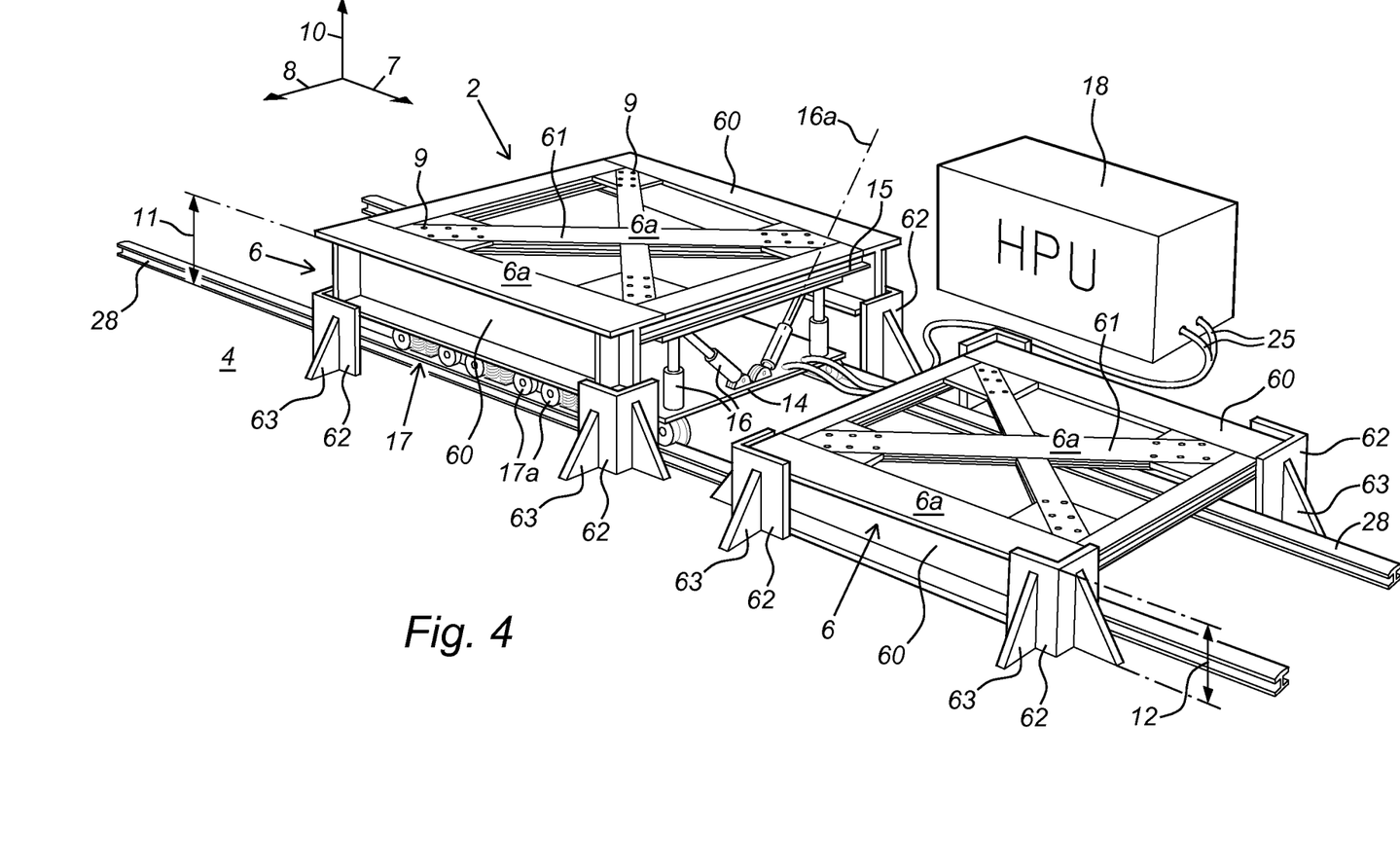
FIG. 4 represents a schematic perspective view of a device according to an embodiment of the invention.
Figure 5:
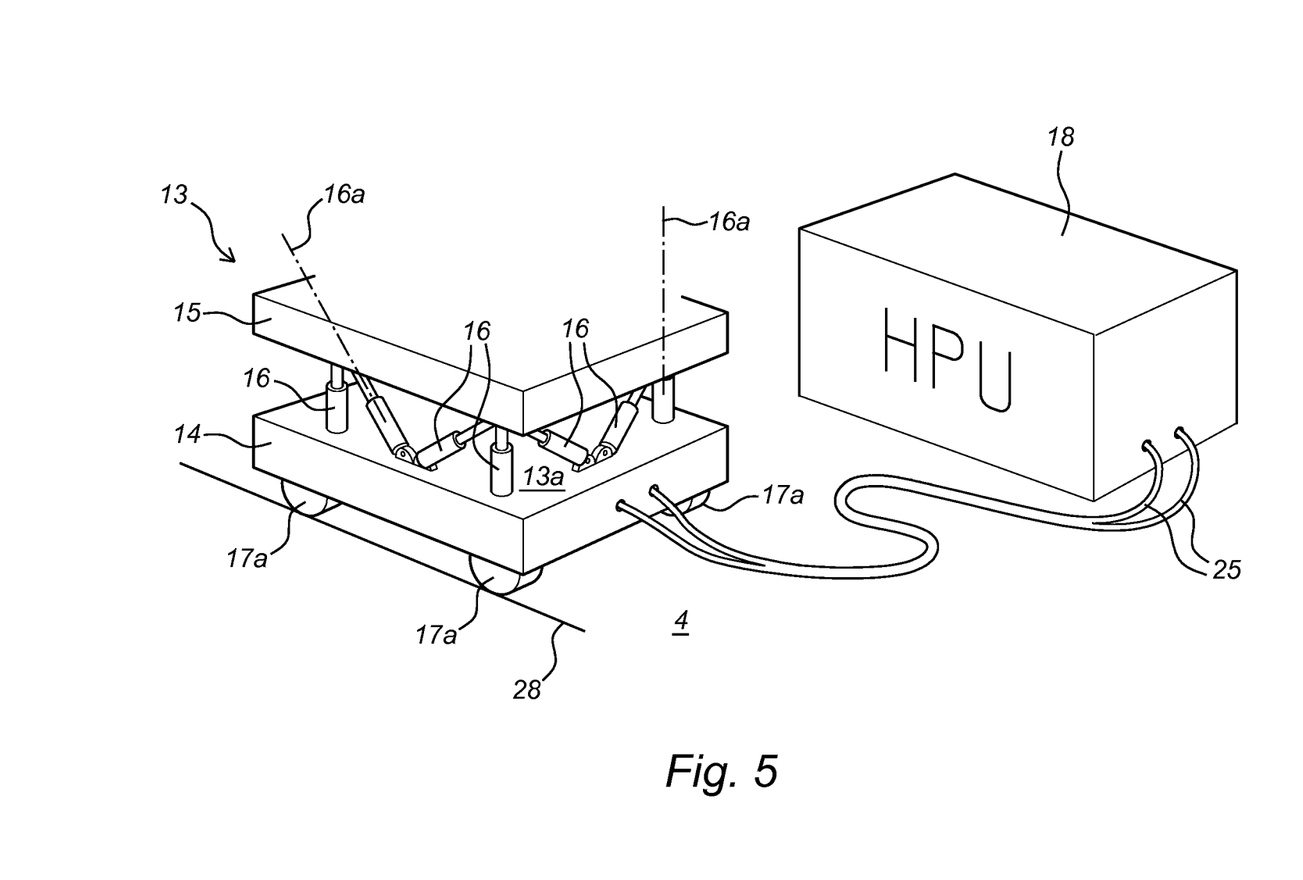
FIG. 5 represents a schematic perspective view of a device according to another embodiment of the invention.

A device 2 according to an embodiment of the invention is shown in more detail in FIG. 4 and comprises a support surface 6a for the monopile 3 provided at a first height 11 in a heave direction 10 relative to the deck 4, a sensor measuring movements imposed onto the vessel 1 its deck 4 at the location of the platform 6 to determine the optimal instant in time to start lifting operations, a lifting crane 5 configured to take up the monopile 3 from the support surface 6a at a lifting point thereof at a lifting speed; a detector configured to determine the instant in time at which the monopile 3 is lifted from the surface 6a; and an actuator system configured to lower the support surface 6a relative to the deck 4 at the instant in time to a second height 12 in the heave direction 10 towards the deck 4 at a lowering speed.

The support surface 6a comprises an upper surface of a support platform 6 that is connected to the deck 4 of the floating vessel 1. As shown, the support platform 6 may comprise a substantially square frame of welded or bolted steel side beams 60, reinforced with steel cross beams 61. Upper flanges of the side beams 60 and the cross beams 61 define a support surface 6a for the monopile 3 to be lifted. The support platform 6 is connected to the deck 4 by four corner posts 62 reinforced with buttress plates 63 and welded to the deck 4. This connection prevents the support platform 6 from moving in a horizontal plane (defined by a surge direction 7 and a sway direction 8) relative to the vessel's deck 4. As a consequence, the support surface 6a is connected to the deck 4 such as to substantially prevent its movement relative to the deck 4 in the sway and surge directions. The connection posts 62 could be present in any other number than four and the support platform 6 of the invention should not be limited to a square or rectangular geometry, but can also be shaped in a different way.

The support surface 6a of the support platform 6 further comprises a number of bolting holes 9 to which an industry standard specific to the object to be lifted, or a specially designed sea-fastening system for the specific object to be lifted, can be attached. For instance, specific sea-fastening profiles 34 for accommodating a monopile 3 could be attached to the support platform through bolting. The support platform 6 does not necessarily has to have bolt holes 9, but the object specific sea fastening can also be welded to the platform 6, in which embodiment the support surface 6a may be continuous to make welding possible over the whole surface 6a. The attachment of the support platform 6 to the deck 4 of the vessel 1 and the platform 6 itself are designed in such a way that all forces induced by the vessel 1 onto the support platform 6 itself and on the object to be lifted and it's specific sea fastening on the support surface 6a of the support platform 6 may be accommodated, during the designed loading, during transit/sailing, and under the working conditions that occur during lifting.

As further shown in FIG. 4, the support platform 6 is not fixed to the vessels deck 4 in a vertical direction relative to the vessel's deck 4 (corresponding to a heave direction 10) but may be moved (lowered or raised) relative to the deck 4 from a first height 11, as shown in the position on the left of FIG. 4, to a second lower height 12, as shown in the position on the right of FIG. 4. The support platform 6 may also be moved in an opposite direction, i.e. from the second height 12 upward to the first height 11. During the transport of the floating vessel 1 and with the support platform 6 in use, a vertical upward movement of the support platform 6 may be prevented by the natural weight of the support platform 6, optionally together with the natural weight of the object specific sea fastening, and the natural weight of the object itself. When the support platform 6 is not in use, i.e. when the support platform 6 is not loaded with a sea fastening or object to be lifted on top, the support platform 6 may be equipped with a temporary locking system to prevent upward movements. Such a locking system may for instance comprise a pin-hole locking system (not shown), and is particularly useful when the natural weight of the support platform 6 is insufficient to prevent upward movements during transport.

The support platform 6 is dimensioned in such a way that a base surface 13a may be moved underneath the support platform 6. The base surface 13a is provided by a base structure in the form of a base platform 13 that may be movably connected to the deck 4 of the floating vessel 1.

The base platform 13 may comprise a base plate 14, an upper surface of which defines the base surface 13a, and which, in an embodiment, may be fixed directly onto the vessel's deck 4; a top plate 15, an upper surface of which contacts the support platform 6 in some positions; and an actuator system provided in between the base plate 14 and the top plate 15, and configured to change the relative vertical position of the base plate 14 and the top plate 15 of the base platform 13. The actuator system shown comprises distance-varying means in the form of a number of cylinder-piston units 16, provided between the base plate 14 and the top plate 15 of the base platform 13. A hydraulic high pressure unit (HPU) 18 provides the cylinder-piston units or jacks 16 with pressurized hydraulic oil through hydraulic hoses 25. The cylinder-piston units 16 each have a longitudinal axis 16a and the longitudinal axis 16a of some cylinder-piston units 16 extends in the heave direction 10 to be able to vary the distance in the heave direction 10 between the support surface 6a and the base surface 13a. The longitudinal axis 16a of other cylinder-piston units 16 provided between the base plate 14 and the top plate 15 of the base platform 13, extends at an acute angle of about 45° with the heave direction 10 in order to provide stiffness in that direction.

The base platform 13 may at an underside thereof facing the deck 4 be provided with a number of bogies 17 positioned along each side-edge of the base platform 13. The bogies 17 carry a plurality of wheels 17a that ride on rails 28 provided on the deck 4 along a defined track. This connection allows the base platform 13 to be moved across the deck 4 of the vessel 1 in the surge direction 7, in the sway direction 8, or in any other direction. The side dimensions of the base platform 13 and its height are limited to enable the base platform 13 to enter a support platform 6 and position the base platform 13 underneath the support platform 6, as shown on the left of FIG. 4, where the support platform 6 is provided at a height 11, but also underneath support platform 6, not shown in the figure, where the support platform 6 is provided at a height 12, as shown on the right of FIG. 4. It should be noted that in the embodiment shown in FIG. 4, the rails 28 are indicated to extend in the surge direction 7. However, the orientation of the rails 28 and the complete device 2 may be different. This orientation may for instance be parallel to the sway direction 8, or may be parallel to another direction, making a non-zero acute angle with the sway 8 and/or surge 7 direction.

The base platform 13 is able to fit under a support platform 6 in a position in which it is not or only partly extended in the vertical (heave) direction. When fitted underneath a support platform 6, extending the hydraulic cylinder-piston units 16 upwards will increase the distance between the top plate 15 and the base plate 14 of the base platform 13 until an upper surface of the top plate 15 contacts an underside of the support platform 6. Extending the hydraulic cylinder-piston units 16 further upwards will lift the support platform 6 together with any additional object specific sea fastening positioned on top of the support platform 6, as well as the actual object to be lifted, for instance the monopile 3, into a position where the platform 6 becomes free from the vessels deck 4 in the vertical direction, in which position the height of the support surface 6a equals the first height 11. This first height 11 is above deck height in the embodiment shown on the left of FIG. 4. Bringing the support surface 6a to a first height 11 is preferably performed just before the lifting operation itself. The height of the corner posts 62 should be such that the support platform 6 may be lifted with the hydraulic cylinder-piston units 16 while still restraining horizontal movements in the x- and y direction (or the surge and sway directions 7 and 8) relative to the vessel 1. This allows taking up any moments induced into the device 2 by vessel movements onto the water. It may also be useful to align the horizontal centre-of-gravities of the base platform 13 in both the x- and y-directions with the resulting horizontal centre-of-gravities in both the x- and y-directions of the combination of the support platform 6, object specific sea fastening and object to be lifted. In this embodiment, the hydraulic jacking system provided in between the top 15 and base plate 14 will only need to be able to withstand vertical forces relative to the vessel's deck 4. Forces acting in other directions may be accommodated by the movement restrictions in the sway and surge directions in the connection (the corner connections 62 and buttress plates 63) of the support platform 6 with the deck 4 of the vessel 1, both in an uplifted and a lower position of the support platform 6. The inclined hydraulic jacks 16 may also be instrumental in taking up non-vertical forces.

In an embodiment in which the base platform 13 is fixed to the vessel's deck 4, the base plate 14 of the base platform 13 may act as a load spreading system transferring substantially all the loads to the vessel's deck 4. In an embodiment in which the base plate 14 of the base platform 13 is not fixed directly onto the vessel's deck 4 at a fixed location, but has the option of moving, load spreading may be achieved by providing the base plate 14 with multiple wheels 17a, spreading out the total weight over the different wheels 17a and over a longer part of underlying rails 28. The rails 28 may further be positioned on top of an additionally provided load spreading plate that is fixed to the vessels deck 4 to spread out further loading.

In the embodiment shown in FIGS. 1 and 2, a plurality of support platforms 6 is positioned in fixed positions across the deck 4 of a vessel 1. An embodiment having a movable base platform 13 allows using one or another limited number of base platform 13s, and moving the base platform 13 across the deck 4 of the vessel 1 to a position underneath each support surface 6a. In FIGS. 1 and 2, six support platforms 6 are shown that are serviced by a minimum of four base platforms 13. Indeed, two pair of rails 28 are provided on the deck 4 and each pair of rails 28 carries a minimum of two base platforms 13 on FIGS. 1 and 2 (not visible in the figures). Each base platform 13 can therefore service multiple support platforms 6. Each base platform 13 can be operated separately from other base platforms 13 at different instants in time. It is also possible to provide multiple platforms 13 that are operated simultaneously and that the hydraulic system acts on both platforms 13 in combination in order to lower multiple support platforms 6 at substantially the same moment in time. This is for instance useful when a larger object, such as the monopiles 3 are supported by two support platforms 6 at the ends, as shown. In this case, the two support platform surfaces 6a may be lowered simultaneously when lifting the monopile 3.

Figure 3A:
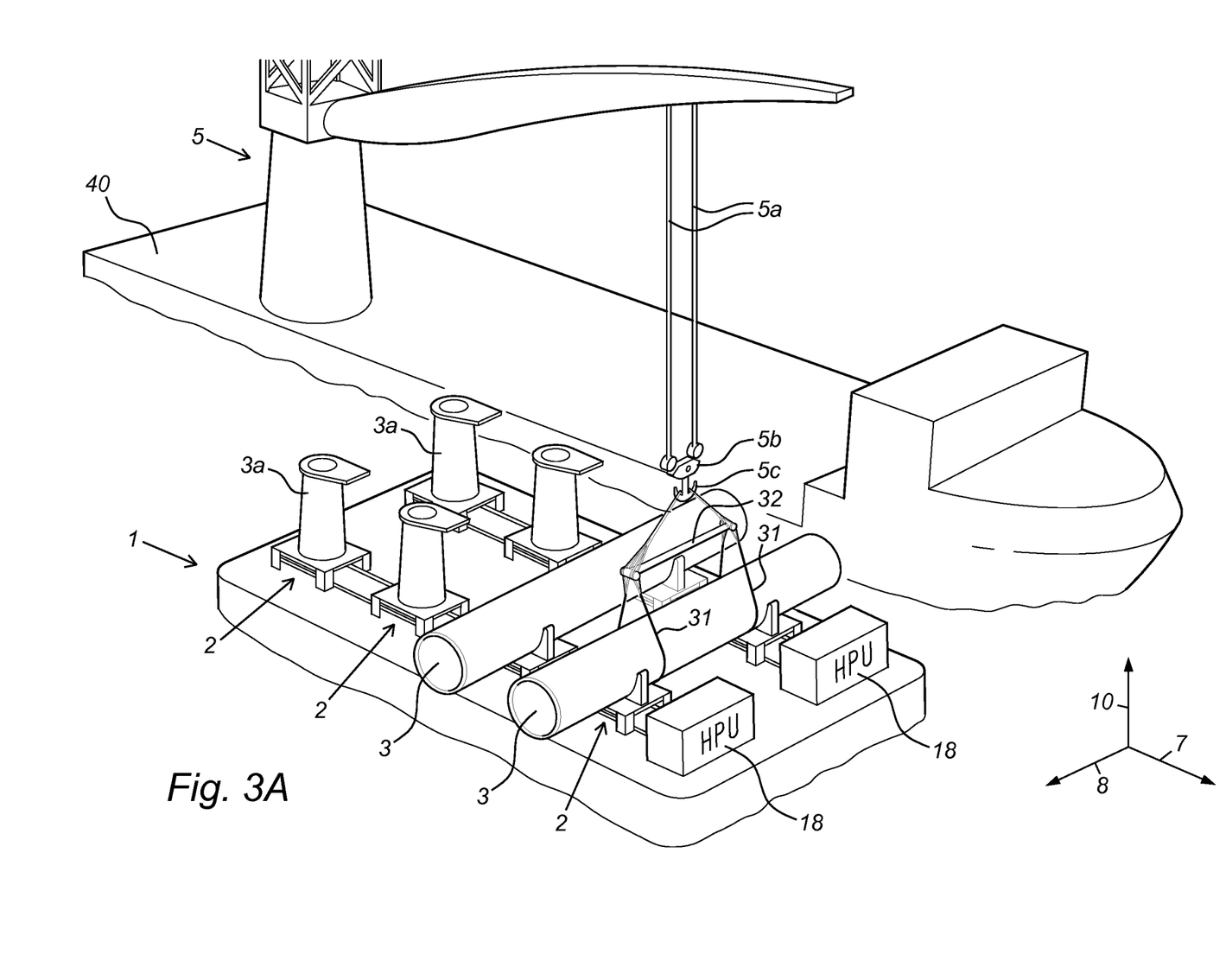
FIG. 3A represents a schematic perspective view of a floating vessel provided with objects and a device for lifting the objects according to another embodiment of the invention in which a lifting crane is operated from a floating vessel.
Figure 3B:
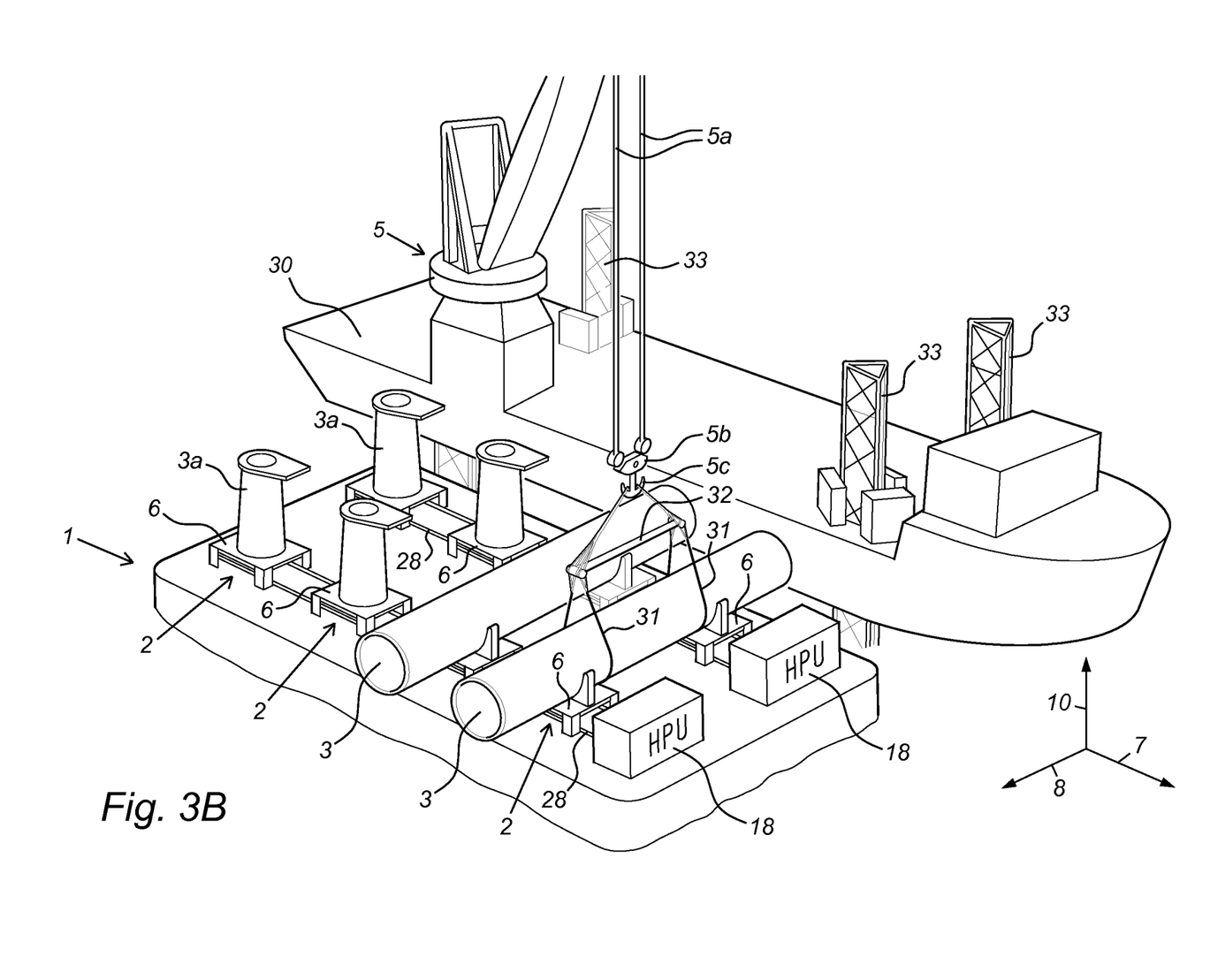
FIG. 3B represents a schematic perspective view of a floating vessel provided with objects and a device for lifting the objects according to the embodiment of FIG. 3A but in which a lifting crane is operated from a jack-up platform.

FIG. 3A (using a floating crane vessel 40) and 3B (using a jack-up crane platform 30) show other embodiments of the invention in which eight support platforms 6 are provided on deck 4. The platforms 6 are serviced by two base platforms 13. Indeed, two pair of rails 28 are provided on the deck 4 and each pair of rails 28 carries one base platform 13 (not visible in the figures). Each base platform 13 therefore services four support platforms. In this embodiment, a base platform 13 on each pair of rails 28 are operated simultaneously in that the hydraulic system acts on both platforms 13 in combination in order to lower the support platforms 6 provided at the ends of the monopiles 3 at substantially the same moment in time.

The second height 12 of the support surface 6a may also be above deck 4 level. In the position of the support platform 6, shown on the right of FIG. 4, a minimum second height 12 is shown. This minimum height corresponds to a support surface's height of a support platform 6 that is resting on the deck 4 of the vessel 1. This may be the position when a base platform 13 is not positioned underneath the support platform 6, as shown on the right of FIG. 4. The base platform 13 however should also be able in this embodiment to be positioned underneath the support platform 6 when it is at a height 12. This can for instance be achieved by designing the height of the base platform 13 and the top plate 15 thereof such that the platform 13 is able to just fit underneath the support platform 16 with the hydraulic jacks 16 fully retracted.

The difference between the first height 11, reached in an uplifted position of the top plate 15 of a base platform 13, and the second height 12, reached in a retracted position of the top plate 15 of the base platform 13, also referred to as the retractable height, may be larger than 0.5 m, more preferably larger than 1 m, and may also be restricted to smaller than 2 m, and even more preferably smaller than 1.5 m. The retractable height may be estimated from the probability of a re-hit according to known engineering practice. This probability may be quantified based on external factors, such as but not limited to a possible value loss of an object after a re-hit, and/or of the device 2 after a re-hit, and/or of the floating vessel 1 after a re-hit, and/or of the lifting crane 5 after a re-hit, and/or the vessel 30 and/or 40 holding the crane 5.

Figure 6:
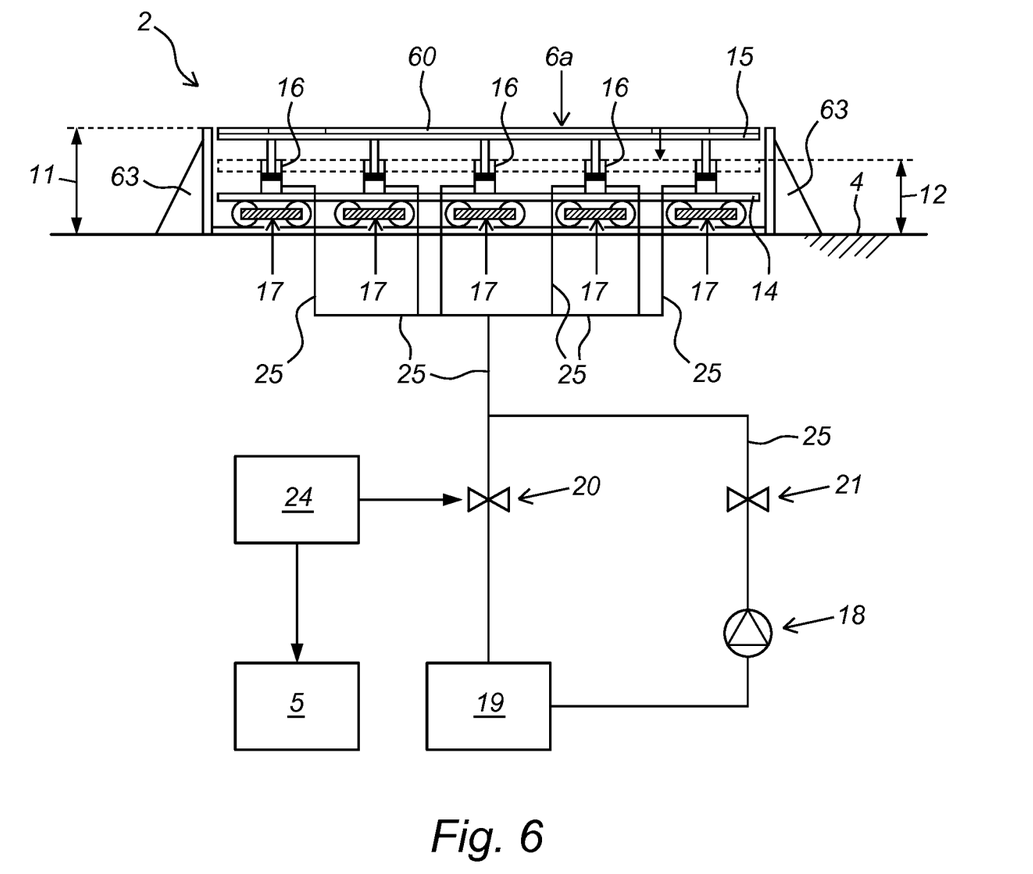
FIG. 6 represents a schematic cross-sectional side view of a device according to yet another embodiment of the invention; and finally
Figure 7:
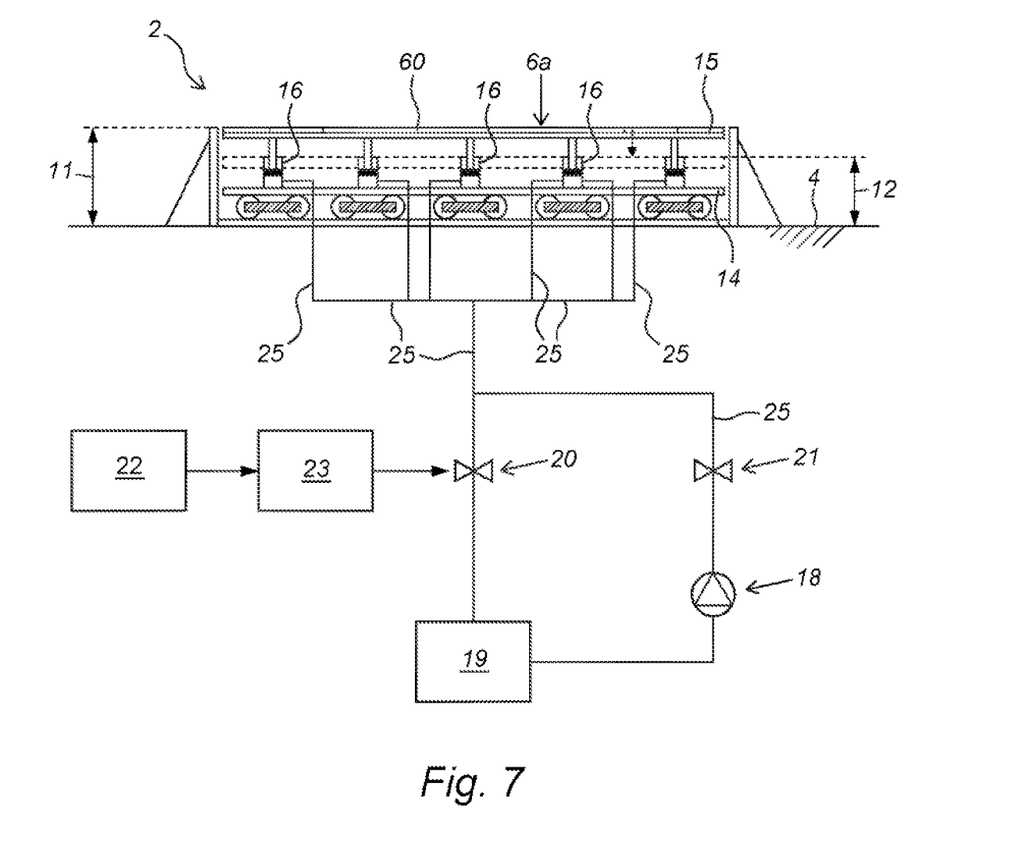
FIG. 7 represents a schematic cross-sectional side view of a device according to yet another embodiment of the invention.

FIGS. 6 and 7 schematically show embodiments of a hydraulic circuit comprising hydraulic lines or hoses 25 linking components of the actuator system, such as the hydraulic cylinder-piston units 16. The hydraulic circuit in addition may comprise a hydraulic pump in the form of a high pressure unit (HPU) 18 to provide hydraulic pressure to the components, and valves to regulate the workings of the hydraulic circuit. The hydraulic circuit in particular comprises at least a storage unit 19 for hydraulic oil and a HPU 18 for pressurizing a lower end of the hydraulic cylinder-piston units 16, provided between the base plate 14 and top plate 15 of the base platform 13. A retraction valve 20 positioned between the lower ends of the hydraulic cylinder-piston units 16 and the storage unit 19 is closed when the hydraulic cylinder-piston units 16 are pressurized and the support surface 6a is positioned at the first height 11 in an elevated position. After pressurizing, the HPU 18 may be closed by a pump valve 21. When opening the retraction valve 20, oil will escape from the lower ends of the hydraulic cylinder-piston units 16 into the storage unit 19 which will about instantaneously depressurize the hydraulic cylinder-piston units 16. This will cause a rapid lowering of the support surface 6a towards the deck 4 from a first height 11 to a second height 12 (according to the position shown in dotted line in FIGS. 6 and 7) which is closer to the deck 4 than the first height 11. Lowering the support surface 6a while lifting the monopile 3 (simultaneously) reduces the risk for a re-hit, i.e. a collision of the monopile 3 with parts of the vessel, or with parts positioned on deck of the vessel 1.

The retraction valve 20 may be operated in a number of ways. Referring to FIG. 6, a human operator 24 of a lifting crane 5 may determine the instant in time at which he wants to lift the monopile 3 from the support platform 6 onto which it is positioned. The operator of the crane can be guided by a sensor measuring the movements imposed on the vessel 1 at the location of platform 6, which provides feedback on the optimal instant in time to start lifting operations. The operator 24 at the same time, or shortly after the start of the lifting operation, opens the retraction valve 20 to cause a sudden lowering of the support surface 6a.

Another embodiment, shown in FIG. 7, uses a detector in the form of one of more force sensors 22 provided in the support surface 6a. The force sensor 22 may detect a force when the monopile 3 is supported by the support surface 6a. This force may decrease to a negligible or nil value when the monopile 3 has left the support surface 6a after the operator 24 lifted it from the support platform 6. This sudden decrease of the force yields information about and/or determines the instant in time at which the monopile 3 has been lifted from the support platform 6 and has left the support surface 6a. The force sensor 22 is coupled to a controller 23 configured to generate control signals for the actuator system in response to the force sensor's output. In particular, the controller 23 may be configured to generate a control signal to open the retraction valve 20 when the force suddenly decreases, for instance with a pre-determined amount. This will cause the cylinder-piston units 16 to retract and so the support surface 6a to lower relative to the deck 4 to the second height 12 in the heave direction 10 at a lowering speed.

The lowering speed may typically depend on the hydraulic circuit and his components and may be designed according to engineering principles.

Before lifting of an object such as the monopile 3, the object may be rigged to the lifting crane 5. In order to be able to lift the object, it should at some point be released or un-seafastened from the object's specific sea fastening system. In cases such as when high operating sea states occur or when an object with a relatively high vertical center of gravity has to be lifted, the sea fastening system may not be released until a short time before the lifting of the object. Otherwise, such an object would be liable for falling onto the deck of the floating vessel, because it may not be able to withstand the movements imposed by the water and vessel 1. In such case, an embodiment in which the hydraulic system controlling the hydraulic jacks 16 may also be connected to a hydraulic sea fastening system and the system programmed such that the sea fastening system will be automatically released (just) before initiating the lifting operation, and therefore (just) before the support platform(s) 6 are retracted in a heave direction 10 towards the deck 4 of the vessel 1, is preferred. In another embodiment, a fail proof detecting system may be used also allowing a lifting crane operator 24 to not only determine the optimal moment at which the lifting should take place, but also preventing him from starting any lifting in case a sensor of the fail proof system reports that the hydraulic sea fastening release system has failed. Since the lifting crane will not start the lifting of the object, the device according to the invention will also not become operative when the object is rigged to the lifting crane and the sea fastening system failed to automatically release the object.

The invention is not limited to the above described embodiments and also comprises modifications thereof, to the extent that these fall within the scope of the claims appended below.

The invention claimed is:

1. Device for lifting an object from a deck of a vessel subject to movements in a heave direction, the device comprising:
   a support surface for the object provided at a first height in the heave direction relative to the deck;
   a lifting crane configured to take up the object from the support surface at a lifting point thereof at a lifting speed;
   a detector, comprising a force sensor located in the support surface, configured to determine the instant in time at which the object is lifted from the surface;
   an actuator system configured to lower the support surface relative to the deck at the instant in time the object is lifted from the surface to a second height in the heave direction at a lowering speed,
   wherein the actuator system comprises distance-varying means provided between the support surface and a base surface,
   wherein the distance-varying means is configured to vary the distance in the heave direction between the support surface and the base surface, and
   wherein the distance-varying means each have a longitudinal axis and the longitudinal axis of some distance-varying means extend in the heave direction, whereas the longitudinal axis of other distance-varying means extend at a non-zero acute angle with the heave direction.

2. Device according to claim 1, wherein at least one of the first and second height of the support surface is above deck.

3. Device according to claim 1, wherein the lifting crane has a maximum lifting speed, and the actuator system is configured to lower the surface at a lowering speed larger than 10% of the maximum lifting speed, more preferably larger than 25% of the maximum lifting speed, and even more preferably larger than 50% of the maximum lifting speed.

4. Device according to claim 1, wherein the actuator system is configured to lower the surface at a lowering acceleration substantially equal to the gravitational acceleration.

5. Device according to claim 1, wherein components of the actuator system are interlinked by a hydraulic system comprising a pump and/or accumulator.

6. Device according to claim 1, wherein the base surface is provided by a part of the deck.

7. Device according to claim 1, wherein the base surface is provided by a base platform structure configured to be moved across the deck of the vessel in at least one of the surge and sway directions.

8. Device according to claim 1, further comprising a control system configured to generate control signals for the actuator system in response to the detector output.

9. Device according to claim 1, wherein the vessel is a floating vessel and the lifting crane is operated from a second distinct vessel, wherein the second vessel is a floating vessel, comprising a dynamic positioning (DP) or mooring system, or the second vessel is a jack-up platform.

10. Device according to claim 1, wherein the object comprises a foundation element of a wind turbine.

11. Method for lifting an object from a deck of a vessel subject to movements in a heave direction, the method comprising:
    positioning the object to be lifted on a support surface for the object provided at a first height in the heave direction relative to the deck;
    taking up the object with a lifting crane from the support surface at a lifting point thereof at a lifting speed; and
    activating an actuator system to lower the support surface relative to the deck
    at an instant in time at which the object is lifted from the support surface to a second height in the heave direction at a lowering speed, the method further comprising:
    determining the instant in time at which the object is lifted from the surface by a detector, wherein the detector comprises a force sensor located in the support surface,
       wherein the actuator system comprises a distance-varying means provided between the support surface and a base surface,
          wherein the distance-varying means is configured to vary a distance in the heave direction between the support surface and the base surface, and
          wherein the distance-varying means each have a longitudinal axis and the longitudinal axis of some distance-varying means extend in the heave direction, whereas the longitudinal axis of other distance-varying means extend at a non-zero acute angle with the heave direction.

12. Method according to claim 11, further comprising determining the instant in time at which the object is to be lifted by monitoring the periodic movements of the vessel in the vertical direction.

13. Device for lifting an object from a deck of a vessel subject to movements in a heave direction, the device comprising:

a support surface for the object provided at a first height in the heave direction relative to the deck;

a lifting crane configured to take up the object from the support surface at a lifting point thereof at a lifting speed;

a detector configured to determine the instant in time at which the object is lifted from the surface;

an actuator system configured to lower the support surface relative to the deck at the instant in time the object is lifted from the surface to a second height in the heave direction at a lowering speed, wherein the actuator system comprises distance-varying means provided between the support surface and a base surface, wherein the distance-varying means is configured to vary the distance in the heave direction between the support surface and the base surface, wherein the base surface is provided by a base platform structure configured to be moved across the deck of the vessel in at least one of the surge and sway directions, and wherein the deck supports a plurality of support surfaces and the base platform structure is configured to be moved across the deck of the vessel to a position underneath each support surface, the base platform structure optionally being provided with wheels to be moved across the deck on rails provided on the deck.

\* \* \* \* \*